United States Patent Office 3,394,158
Patented July 23, 1968

3,394,158
COMPLEX ALUMINIUM HYDRIDES PARTLY SUBSTITUTED WITH ALCOXYLIC GROUPS
Paolo Chini and Agostino Baradel, Milan, and Chiara Vacca and Marcello de Maldé, San Donato Milanese, Italy, assignors to SNAM S.p.A., Milan, Italy, a company of Italy
No Drawing. Filed Sept. 28, 1964, Ser. No. 399,889
Claims priority, application Italy, Oct. 2, 1963, Patent 706,048
1 Claim. (Cl. 260—448)

ABSTRACT OF THE DISCLOSURE

Reducing agents are produced by reacting with aluminum and hydrogen an alcoholate of sodium, potassium, cesium or rubidium in the presence of a dispersing agent. The reaction is carried out at a temperature between 75° and 300° C. and at a pressure between 10 and 500 atmospheres. The product has the general formula:

$$Me_nAlH_x(OR)_y$$

where Me is chosen from Na, K, Rb, and Cs, R is a hydrocarbon radical, and $n$ is an integer and either 1 or 3 and $x$ and $y$ are integers whose sum is $n+3$.

---

It has been known for a long time that it is possible to obtain complex aluminum hydrides by the action of hydrogen upon mixtures of aluminum with another metal or with a hydride thereof, for instance according to the reactions:

$$Na+Al+2H_2 \rightarrow NaAlH_4$$
$$KH+Al+1.5H_2 \rightarrow KAlH_4$$

Recently in a patent application of the same applicant a process was disclosed for obtaining complex aluminum hydrides with sodium and potassium by making hydrogen act upon mixtures of aluminum with the corresponding alkali metal fluorides (Me) according to the reaction:

$$4Al+6MeF+6H_2 \rightarrow 3MeAlH_4+Me_3AlF_6$$

Now it has been found that, in suitable conditions, it is possible to react with aluminum and hydrogen the alcoholates of sodium, potassium cesium, rubidium, so as to obtain compounds or mixtures of compounds in which are contemporaneously present aluminum, alkali metal, hydride groups and alkoxy groups. The process of the present invention in fact consists in heating under hydrogen pressure a suspension of a sodium or potassium alcoholate and of metallic aluminum in the presence of a suitable dispersing means.

In that way there are obtained reaction mixtures constituted not only by the dispersing means and possibly by non-transformed reactants, but also by one or more of the compounds comprised in the general formula:

$$Me_nAlH_x(OR)_y$$

where:
Me may be Na, K, Rb, Cs;
R is an alkyl, aryl or aryl-alkyl radical;
$n$ is 1 or 3;
$x$ and $y$ are such integers that their sum is equal to $n+3$.

The type of compound obtained varies according to the proportions between the reactants and to the character of the alcoholates employed. The formation of the products corresponding to the aforesaid general formula can be explained by supposing the process to take place in successive stages

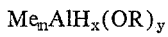
$$Al+\tfrac{3}{2}H_2+MeOR \rightarrow MeAlH_3(OR)$$
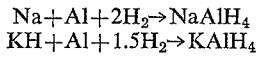
$$MeAlH_3(OR)+2MeOR \rightarrow Me_3AlH_3(OR)_3$$

where Me and R have the cited meaning.

These two steps may be followed by disproportioning reactions leading to the obtaining of complex final mixtures.

Of the compounds corresponding to the general formula reported hereinbefore, only $NaAlH(OC_2H_5)_3$ was known, but prepared by another method by Schmitz-Dumont et al. as reported in "Naturwissenschaften," vol. 30, page 20, of 1952; which therefore constitutes, as a product, the only compound excluded from the present invention.

In operating according to the present invention, the reaction is conducted in an autoclave equipped with a stirring device, preferably with a grinding effect, for instance in a rotary autoclave containing steel balls.

The aluminum to be employed should preferably be a fine powder and be free from any oxide. A powdery aluminum of the trade protected against oxygen or moisture, e.g. under a hydrocarbon-type solvent, suffices. To eliminate sensible amounts of oxide one can resort to activation by one of the already known methods, such as, for instance, grinding in the presence of an inorganic inert medium and possibly in the presence of an aluminum-alkyl, or heating with hydrogen and an aluminum-alkyl to 100–150° C. and at 100–200 atmospheres.

For the reaction with aluminum and hydrogen compounds of the general formula MeOR are employed, where Me represents any one of the alkali metals Na, K, Rb, Cs; and R is an alkyl, aryl or aryl-alkyl radical, possibly substituted with ether groups or tertiary aminic groups with the limitation that it should be sufficiently stable in the conditions adopted for the reactions of the present process. Examples of such alcoholates are:

$MeOCH_3$, $MeOC_2H_5$, $MeO-CH(CH_3)_2$
$MeO-CH_2-CH_2-CH_2-CH_3$, $MeO-C(CH_3)_3$
$MeO-(CH_2)_{11}-CH_3$, $Me-O-CH_2-CH_2-OCH_3$
$MeO-CH_2-CH_2-N(CH_3)_2$, $Me-O-CH_2-CH_2-O-CH_2-CH_2-O-CH_3$

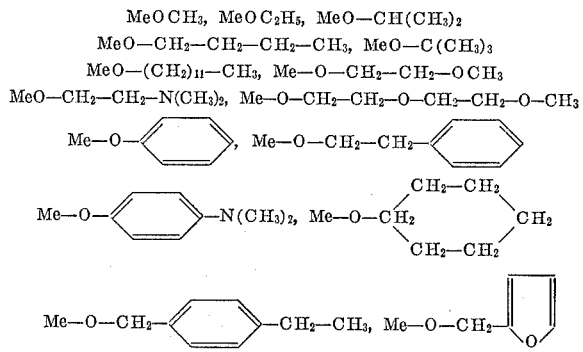

The ratio between moles of alkali metal alcoholate and gram atoms of aluminum may vary in a wide range; it is possible to select a value between 0.1 and 10, preferably between 1 and 4. It is found to be advantageous to add to the reaction mixture a small molar percentage (0.2–5%) of a compound such as a hydride or metal-organic or an alkoxide of any one of the following metals Al, B and Zn such as for instance: $NaAlH_4$, $LiAlH_4$, $AlEt_3$, $KAlH_4$, $AlEt_2Cl$, $Al(isobutyl)_3$, $NaBH_4$, $B(Et)_3$, $Zn(Et)_2$, $LiBH_4$, $Na_2ZnEt_4$, $NaAlEt_4$, $Al(OEt)_3$, etc.

It may also be advantageous to operate in the presence of little free alcohol or of an alkyl halide. In fact said substances originate, by reaction with the metallic aluminum, alkoxides or alkyls of aluminum.

In general the reaction is conducted in the presence of an organic medium, liquid, or liquefiable at the temperature of reaction, which does not react or reacts only slowly with the reactants or with the products of the reaction.

For instance it is possible to employ aliphatic hydrocarbons such as n-heptane, iso-octane, paraffin oil; cycloaliphatic hydrocarbons such as cyclohexane and dekahydronaphthalene; aromatic hydrocarbons such as benzene, toluene, isopropyl-benzene; ethers, such as diethyl ether, di-n-butyl ether, dimethyl ether of ethylene glycol, dimethyl ether of diethylene glycol, anisole, tetrahydrofuran, dioxane; tertiary amines, such as triethyl amine, tri-n-butyl amine, dimethyl aniline, piperidine, or their mixtures.

Some ethereal and aminic compounds afford the advantage of partly or totally dissolving some of the alcoholates and reaction products.

The reaction is generally conducted at temperatures between 75 and 300° C., the selected temperature depending on the type of liquid phase present and on the stability of the alcoholate employed; preferably one operates between 100 and 200° C.

Pressure generally is kept between 10 and 500 atmospheres, preferably between 50 and 200 atmospheres. In any case there are obtained suspensions constituted by mixtures of compounds which can be separated by extraction with solvents of ethereal type which generally dissolve the compounds of the cited general formula when $n=1$ and leave those undissolved which have said general formula with $n=3$.

X-ray examination of the separated fractions permits recognizing the main component or the two main components.

The products so obtained can find employment in the field of organic chemistry as selective reducing agents, the action of which can be varied depending on the ratio between active hydrogen and alkoxyl groups as well as on the kind of the alkoxy groups and of the alkali metals employed; and, moreover as intermediates in the synthesis of metal-organic compounds and as co-catalysts of polymerization.

The following examples are illustrative of the present invention. Normally, all of the operations are carried out in an atmosphere of nitrogen or of another inert gas.

EXAMPLE 1

Into a rotary autoclave of 517 ml. volume there are intoduced 15 steel balls of 20 mm. diameter and, then, in nitrogen atmosphere, 5.40 grammes of powdery aluminum of the trade (previously deoxidized and activated by heating with aluminum triethyl to 150° C. at 150 atmospheres of hydrogen), 10.80 g. of sodium methylate free of methyl alcohol (Na/Al ratio=1), 2.4 ml. of a 4.2-molar solution of triethyl aluminum in toluene and 190 ml. of anhydrous ethyl ether; finally hydrogen is compressed up to 120 atmospheres and heating is effected for about 4 hours between 145 and 166° C. After cooling, the pressure is 106 atmospheres and the transformation, calculated on the basis of the pressure drop, is 50% with respect to the metallic aluminum introduced. The reaction mixture is filtered and the ethereal solution as well as the residue are brought to dryness under vacuum. The residue from evaporation of the filtrate consists of $Na[Al(OCH_3)_4]$.

The insoluble residue collected on the filter visibly contains much metallic aluminum; by decomposition with methanol in anhydrous dioxane it develops 580 N cc. of hydrogen per gamme and contains 5 groups of H for each group —$OCH_3$.

These and other data are in accord with the formula $Na_3[AlH_5(OCH_3)]$.

The X-ray diffraction spectrum detects the absence of sodium methylate and, in addition to metallic aluminum, there appears to be present the aforesaid crystalline substance displaying the following X-ray diffraction lines: 2.72 vs.; 1.93 ms.; 1.59 ms.; 1.56 s.; 1.37 mw. and 1.22 mw.

EXAMPLE 2

Into the same autoclave of the preceding example there are introduced in a nitrogen atmosphere 6.80 g. of activated powdery aluminum; 29.7 g. of sodium methylate (Na) Al ratio=2.2; 1.8 ml. of $Al(C_2H_5)_3$ with 95% purity and 200 ml. of anhydrous diethyl ether; finally hydrogen is compressed up to 113 atmospheres and the whole is heated for about 4 hours between 160 and 163° C. After cooling the pressure is 81 atmospheres and the transformation, calculated on the basis of the pressure drop, is 84%. The reaction mixture is transferred onto a porous-sept extractor and is extracted thoroughly with anhydrous diethyl ether. Both the ethereal extract and the residue are brought to dryness under vacuum. The ethereal extract is substantially the compound $Na[Al(OCH_3)_4]$. The residue is substantially free of aluminum metal and of sodium methylate; the results of analysis correspond to a mixture of the compounds $Na_3[AlH_4(OCH_3)_2]$ and $Na_3[AlH_3(OCH_3)_3]$. By attack with anhydrous n-butyl alcohol there are developed 535 N-ml. of hydrogen per gramme. The X-ray diffraction spectrum displays the following main lines: 8.19 s.; 5.245 mw.; 2.82 vs.; 2.75 s. diff.; 2.43 vs.; 1.93 w.; 1.725 s.; 1.47 s.; 1.41 w.; 1.22 w.; 1.19 w.; 1.09 w.; 0.99 w.; 0.94 w.

EXAMPLE 3

Into the same autoclave of the preceding examples there are introduced, in nitrogen atmosphere, 4.65 grammes of activated powdery aluminum, 36.5 grammes of potassium methylate (K/Al ratio=3), 2.5 ml. of 4 N-solution of $Al(C_2H_5)_3$ in toluene, 250 ml. of anhydrous toluene; hydrogen is compressed up to 100 atmospheres and the whole is heated for about 5 hours between 165 and 180° C. After cooling the pressure is 72 atmospheres and the corresponding transformation is 77%. The reaction mixture is filtered: the toluenic filtrate does not contain any Al or K in solution; the residue is brought to dryness and is analyzed. By attack with anhydrous n-butanol it develops 205 N ml. of hydrogen per gramme. The results of analysis correspond to a mixture of the two compounds $K_3[AlH_2(OCH_3)_4]$ and

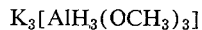
$$K_3[AlH_3(OCH_3)_3]$$

The X-ray diffraction spectrum presents the following main lines: 8.265 vs.; 3.30 vs.; 3.185 w.; 3.03 w. diff.; 2.85 s.; 2.74 w. diff.; 2.60 w.; 2.01 ms.; 1.72 ms.; 1.65 w.; 1.275 w.; 1.17 w.; 1.10 w.

EXAMPLE 4

Into the same autoclave of the preceding examples are introduced, in nitrogen atmosphere, 6.88 grammes of aluminum powder, activated; 62.7 grammes of sodium isopropylate (Na/Al ratio=3); 2 ml. of 95% $Al(C_2H_5)_3$; 250 ml. of anhydrous toluene; finally hydrogen is compressed up to 129 atmospheres and the whole is heated between 175 and 188° C. for about 4 hours. After cooling, the pressure is 103 atmospheres and the transformation correspondingly is 50%. The reaction mixture is filtered: the toluenic filtrate contains only traces of organic Al; the residue is brought to dryness and is analyzed. By attack with anhydrous n-butyl alcohol, 131 N ml. of hydrogen per gramme are developed. The analytical data are in accord with a mixture of the compounds $Na_3[AlH_2(O—C_3H_7)_4]$ and $Na_3[AlH(OC_3H_7)_5]$. The X-ray diffraction spectrum detects the presence of metallic aluminum and of small quantities of sodium isopropylate and moreover of one or two crystalline substances having the following main X-ray diffraction lines: 8.13 vs.; 5.72 w.; 4.90 w. diff.; 4.35 s.; 2.39 w.; 3.55 w.; 3.16 w. diff.; 2.82 c.; 2.59 w.; 2.44 ms.; 1.72 m.; 1.47 m.; 1.12 w.; 1.09 w.; 0.86 w. diff.

EXAMPLE 5

Into the same autoclave of the preceding examples there are introduced in nitrogen atmosphere 7.70 grammes of powdery activated aluminum, 33.9 grammes of sodium t-butylate (Na/Al ratio=1.25), 2 ml. of 95% $Al(C_2H_5)_3$, 250 ml. of anhydrous toluene and finally hydrogen is compressed up to 123 atmospheres and the whole is heated between 170 and 191° C. for about 5 hours. After cooling the pressure is 90 atmospheres and the transformation correspondingly is 50%. The reaction mixture is filtered: the toluenic filtrate contains only traces of Al in solution; the residue is brought to dryness and is analyzed. By attack with anhydrous n-butylic alcohol there are developed 238 N ml. of hydrogen. The analytic data are in accord with the formula $$Na[AlH_2(O-C_4H_5)_2]$$

The X-ray diffraction spectrum detects the presence of metallic aluminum and of a crystalline compound of which the main X-ray diffraction lines follow: 8.60 s.; 7.90 s.; 4.70 m. diff.; 4.33 m. diff.; 2.74 s.; 1.93 w.; 1.59 w.; 1.56 w.; 1.37 w.; 1.16 w.

s.=strong
m. diff.=medium diffused
w.=weak
vs.=very strong.

EXAMPLE 6

Into an oscillating autoclave of 515 ml. volume there are introduced, in nitrogen atmosphere, 8.04 grammes of powdery activated aluminum, 28.6 grammes of sodium n-butylate (Na/Al ratio=1), 2.5 ml. of 4 N solution of Al(C₂H₅)₃ in toluene, 250 ml. of anhydrous diethyl ether; finally hydrogen is compressed up to 110 atmospheres and the whole is heated for 16 hours between 160 and 185° C. After cooling the pressure is 93 atmospheres and the corresponding transformation is 38%. The reaction mixture is filtered and both the filtrate and residue are brought to dryness. The residue from evaporation of the ethereal filtrate contains about 30% of the metals introduced and is a mixture of the compounds $$Na-O-C_4H_9, Na[Al(OC_4H_9)_4]$$
and $Na[AlH(OC_4H_9)_3]$ The residue on the filter is a pyrophoric powder containing 19% of metallic aluminum and the analytic data whereof correspond to a mixture of the compounds Na[AlH₂(OC₄H₉)₂] and Na[AlH₃(OC₄H₉)]. By attack with anhydrous n-butyl alcohol there are developed 575 N ml. of hydrogen per gramme.

EXAMPLE 7

Into the same autoclave of the preceding example there are introduced, in nitrogen atmosphere, 9.90 grammes of powdery activated aluminum, 61.0 grammes of sodium phenylethylate (Na/Al ratio=1), 2.5 ml. of 4% solution of Al(C₂H₅)₃ in toluene, 250 ml. of anhydrous diethyl ether; finally hydrogen is compressed up to 106 atmospheres and the whole is heated for about 20 hours between 161 and 176° C. After cooling the pressure has decreased to 87 atmospheres and the corresponding transformation is 34%. The reaction mixture is transferred into a porous-sept extractor and is extracted thoroughly with diethyl ether; both the etheral extract and the residue are brought to dryness. The residue from evaporation of the ethereal extract is a mixture of sodium derivatives and of sodium-aluminum derivatives of phenyl acetic alcohol and does not develop any gas by attack with alcohols. The residue from extraction by attack with anhydrous n-butyl alcohol develops 31.5 N ml of hydrogen per gramme.

EXAMPLE 8

Into the same autoclave of Examples 1–7 there are introduced, in nitrogen atmosphere, 7.75 grammes of powdery activated aluminum, 40.0 grammes of sodium phenate (Na/Al ratio=1), 3 ml. of 4 N solution of Al(C₂H₅)₃ in toluene; then H₂ is compressed up to 140 atmosphere and the whole is heated between 160 and 174° C. for 19 hours. After cooling the pressure is 102 atmospheres and the corresponding transformation is 75%. The reaction mixture is filtered and the residue is extracted thoroughly with dimethyl ether of ethylene glycol. The toluenic filtrate, the extract with dimethyl ether of the ethylene glycol and the residue from extraction are brought to dryness and the products obtained are examined by X-rays and analyzed.

The residue from the toluenic filtrate is a crystalline compound (a) plus amorphous impurities; by attack with anhydrous n-butyl alcohol it develops 24 N ml. of hydrogen per gramme, and presents the following main X-ray diffraction lines; 7.37 w.; 4.31 s. diff.; 3.86 mw.; 3.55 w.; 2.60 m.; 1.82 w.; 1.67 w.; 1.64 w. (s. diff.=strong diffused).

The extract with dimethyl ether of ethylene glycol is constituted by small quantities of sodium phenate and by a crystalline compound (b); by attack with anhydrous n-butyl alcohol it develops 191 N ml. of hydrogen per gramme and presents the following main X-ray diffraction lines: 3.01 s.; 2.75 s.; 2.515 w.; 1.93 w.; 1.88 w.; 1.58 w. diff.; 1.52 w.; 1.22 w. diff.

The extraction residue is metallic aluminum and a crystalline compound (c); by attack with anhydrous n-butyl alcohol it develops 1080 N ml. of hydrogen per gramme; the results of analysis are in accord, for the compound (c), with the formula

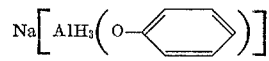

The compound presents the following main X-ray diffraction lines: 4.46 w.; 3.88 w.; 3.51 w.; 2.73 vs.; 2.44 mw.; 2.15 w.; 1.33 s.; 1.88 w.; 1.70 w. diff.; 1.59 s.; 1.57 s.; 1.46 w.; 1.37 m.; 1.13 w.; 1.11 w.; 1.04 w.; 1.03 w.

The embodiments of the invention in which an exclusive property or privilege is claimed are defined as follows:

1. Hydride compounds of aluminum and alkali-metals of the general formula:

$$Me_3AlH_x(OR)_y$$

wherein Me is selected from the group consisting of Na, K, Rb and Cs, R is an ethyl radical substituted by groups selected from the group consisting of tertiary aminic and etherified hydroxylic groups, and x and y are integers such that their sum is equal to 6.

References Cited

UNITED STATES PATENTS

| | | | |
|---|---|---|---|
| 2,787,626 | 4/1957 | Redman | 260—448 |
| 3,104,252 | 9/1963 | Radd et al. | 260—448 |
| 3,207,770 | 9/1965 | Ziegler et al. | 260—448 |
| 3,147,272 | 9/1964 | Brown | 260—448 |
| 3,184,492 | 5/1965 | Cole | 260—448 |

FOREIGN PATENTS

| | | |
|---|---|---|
| 878,136 | 9/1961 | Great Britain. |

OTHER REFERENCES

Chemical Abstracts, vol. 52, pp. 10871–10872, 1958.
Chemical Abstracts, vol. 55, pp. 22312 ef (1961).

TOBIAS E. LEVOW, *Primary Examiner.*

H. M. S. SNEED, *Assistant Examiner.*